Dec. 16, 1952  H. W. TREVASKIS  2,621,936
CONTROL DEVICE FOR FLUID PRESSURE SYSTEMS
Filed Nov. 13, 1948  2 SHEETS—SHEET 1

INVENTOR
Henry William Trevaskis
by Benj. T. Rauber
his attorney

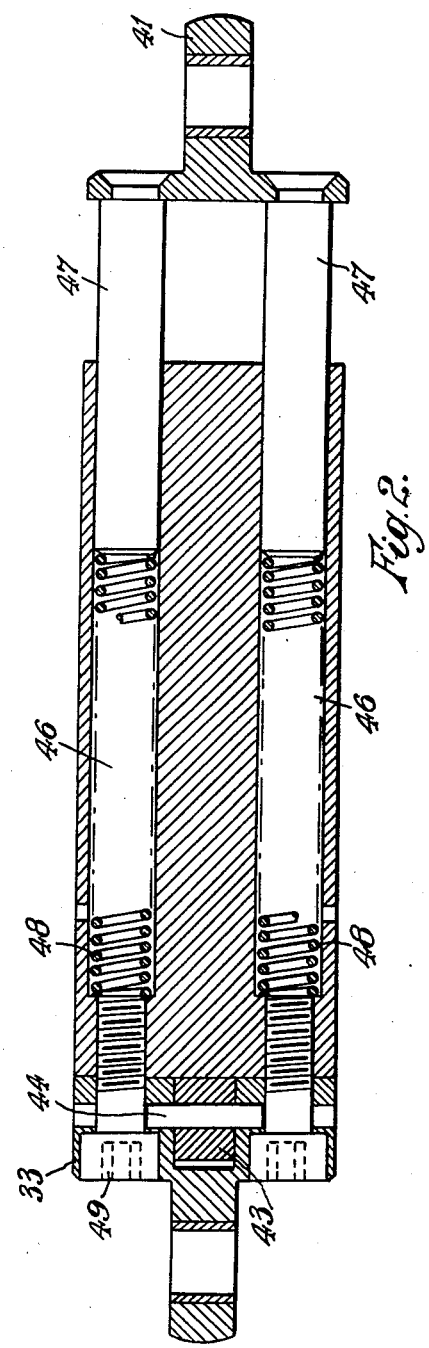

Patented Dec. 16, 1952

2,621,936

UNITED STATES PATENT OFFICE 2,621,936

CONTROL DEVICE FOR FLUID PRESSURE SYSTEMS

Henry William Trevaskis, Solihull, England, assignor to Dunlop Rubber Company Limited, London, England, a British company Application November 13, 1948, Serial No. 59,821
In Great Britain November 28, 1947

6 Claims. (Cl. 277—21)

1

This invention relates to an improved control device for fluid pressure systems, particularly for the braking systems of vehicles such as aircraft.

Braking pressure when applied by hand or foot is substantially proportional to the movement of the control lever but the simple mechanical arrangement thus made possible will not suffice when the braking pressure is applied hydraulically or pneumatically. In such cases means must be provided to open the delivery valve to admit fluid pressure to the braking system and to close it automatically when the braking pressure has been built up to the desired amount. A further movement of the control lever in one direction must permit the braking pressure to be augmented but movement in the opposite direction must open an exhaust valve and permit a diminution or the complete release of the pressure in the braking system. Such control devices for fluid pressure systems are well known.

With such control devices the time of application of the brake is a function of the pressure in the fluid pressure system and may be diminished by increasing that pressure. The time of release of the brake is also important and for any given braking pressure may be diminished by, for example, increasing the diameter of the exhaust valve. The sensitivity of the control device is however diminished when the diameter of the exhaust valve is increased and it has therefore been proposed to employ an auxiliary exhaust valve which opens automatically shortly after the opening of the main exhaust valve and thus ensures a rapid withdrawal of fluid from the brake mechanism. A control device is known in which an auxiliary exhaust valve is opened by a lever arrangement operated by the movement of the main exhaust valve. Such control devices are necessarily bulky and heavy.

It is an object of this invention to provide a control device having main and auxiliary exhaust valves for a fluid pressure system, that is light in weight, of simple construction, and of compact form.

According to the present invention a device having delivery and exhaust valves for controlling the supply of fluid under pressure to and from fluid pressure operated mechanism comprises an auxiliary exhaust valve co-axial with the main exhaust valve and forming the seating of the said main valve, the said auxiliary valve being adapted to be opened automatically to exhaust after the main exhaust valve opens whereby the said auxiliary valve permits a rapid withdrawal of the fluid pressure from the operating chamber.

2

An embodiment of the invention will now be described with reference to the accompanying drawings in which:

Figure 2 is a section on the line 2—2 of Figure 1.

Figure 1:
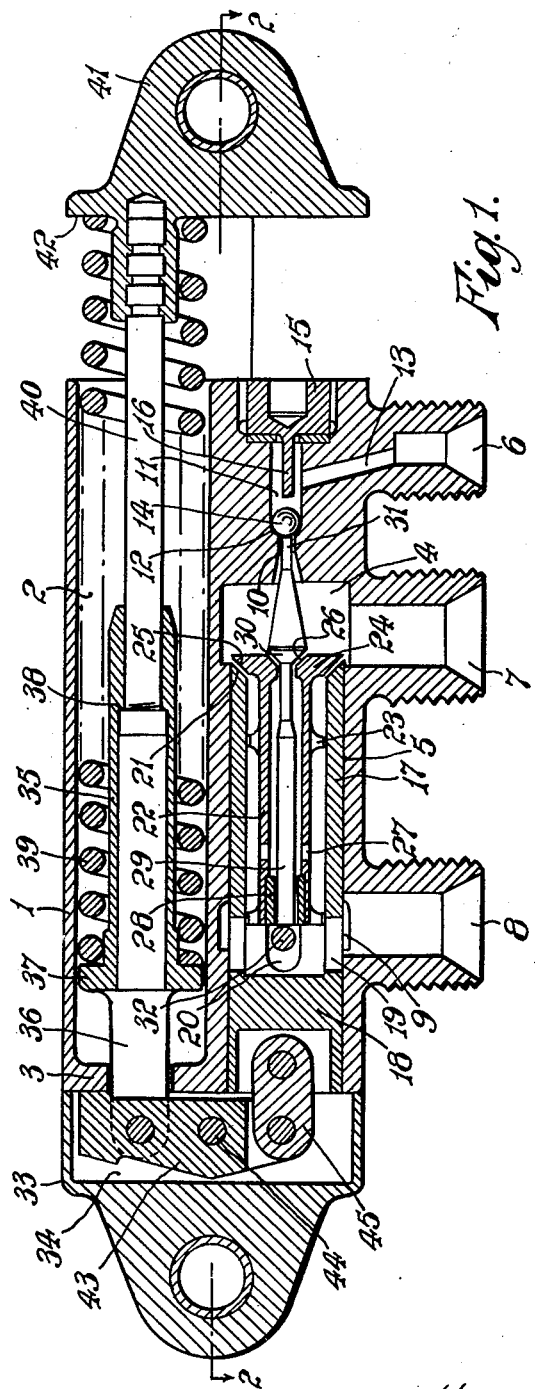
Figure 1 is a sectional elevation of a control device.

The device comprises an inlet valve, a main exhaust valve, an auxiliary exhaust valve co-axial with said main exhaust valve, an operating chamber, and an actuating means all arranged within a common casing 1, said casing being substantially divided into parallel cylindrical housings. One housing comprises the operating chamber 4 and a cylinder 5 for the exhaust valve arrangement and has inlet, outlet and exhaust branches integral therewith, and another housing 2 contains the actuating means of the device. Two other housings 46 contain guide rods 47 as hereinafter described.

The exhaust valve cylinder 5 is open at one end and leads into the co-axial operating chamber 4 at the other end, said operating chamber being shorter but of larger diameter than said valve cylinder. The valve cylinder has an integral cylindrical exhaust branch 8 at right angles thereto adapted for connecting to a reservoir for operating fluid, and in line with said exhaust branch the cylinder has a co-axial annular cavity 9. The operating chamber 4 has an integral cylindrical outlet branch 7 at right angles thereto and parallel to said exhaust branch for connecting to a mechanism to be operated, e. g. a brake mechanism. Leading from the operating chamber 4 and co-axial therewith is an inlet passageway 10 of relatively small diameter with a co-axial extension 11 of slightly larger diameter, the step 12 between the two diameters forming a part spherical seating for a ball valve 14. Said larger diameter passageway has a radially inclined passageway 13 communicating with a cylindrical inlet branch 6 which is integral with the casing, said inlet branch being parallel to the afore-mentioned exhaust and outlet branches and being adapted for connection to a source of fluid under pressure. A plug 15 is secured into the end of the housing containing the inlet passage, said plug having a projection 16 which extends into the passageway 11 and acts as a stop for the ball valve 14.

The exhaust valve arrangement comprises two cylindrical sleeves, arranged co-axially one within the other and spaced from each other by outer radial guide flanges 23 integral with the inner sleeve 22, and a conical main valve 30 attached to a central stem 29. The outer sleeve 17 is slidably arranged within the afore-mentioned exhaust valve cylinder and has one end closed, the other end having a conical surface 21 to act as a valve seating. Two diametrically opposite radial holes 19 are provided adjacent the closed end of said outer sleeve and in line with the annular cavity 9 and exhaust branch 8 in the cylinder, and two axial slots 20 angularly spaced at right angles to said radial holes have a stop pin 32 passing through them which is secured into the cylinder wall.

The inner sleeve 22 has an integral outer and inner radial flange 24 at one end, the edge of the outer flange having a conical surface 25 to form the auxiliary valve and co-operate with the conical seating 21 on the outer sleeve, and the inner flange having a conical aperture 26 forming a seating for the conical main valve 30. A cylindrical liner 28 of smaller bore than the sleeve is fitted into the end of the inner sleeve 22 remote from the valve and this end abuts against the stop pin 32 when the device is in the inoperative position. Radial holes 27 in the wall of the inner sleeve and axial holes in the guide flanges 23 of the inner sleeve allow the passage of fluid therethrough. Co-axially arranged with the inner sleeve is the aforesaid conical valve 30 having a stem 29 which extends within said sleeve to abut against the stop pin 32 and a stem 31 which passes through the operating chamber 4 into the inlet passage 10 to act as a finger for the inlet valve 14.

The inlet valve comprises a ball 14 co-operating with the part-spherical seating 12 within the inlet passageway and movable between said seating and the projection 16.

The housing 2 containing the actuating means of the device is open at one end and has an inner radial flange 3 with a central opening at the other end. An end cover 33 is secured to the end of the casing adjacent the flanged end of said housing and the open end of the exhaust valve cylinder by means of screws 49, and forms a chamber 34 connecting the two.

A tubular member 35 is arranged within the housing 2, and has a projecting portion 36 passing through the opening in the internal flange 3 of said housing and into the chamber 34, an outer radial flange 37 to act as an abutment for one end of a helical spring 39, and an internal shoulder 38 to act as an abutment for a central co-axial movable rod 40. One end of said rod is arranged to slide within the tubular member, the other end being secured to a foot pedal attachment 41, which has an abutment 42 for the other end of the helical spring. Said helical spring is assembled within the housing 2 and around the tubular member and movable rod.

A rocking lever 43 is pivoted, by means of the pin 44, within the end cover 33 and one end of said lever is attached to the projecting portion 36 of the tubular member 35, the other end being attached to the closed end 18 of the outer exhaust valve sleeve 17 by means of an intermediate link 45.

Two guide cylinders 46 are provided in the casing, these being parallel to the two main housings. Guide rods 47, which are fixed to the pedal attachment 41, slide within said guide cylinders against the action of helical springs 48.

In the inoperative position of the device the ball valve 14 seals the passageway from the source of fluid under pressure and both exhaust valves are open.

In operation, with the device connected to a source of fluid under pressure and to a brake mechanism, force is applied to the foot pedal causing the movable rod 40 to slide within the tubular member 35, thus compressing the helical spring 39 and moving the rocking lever 43 on its pivot 44. Movement is transmitted through the rocking lever and intermediate link 45 to the outer exhaust valve sleeve 17, said sleeve sliding within the cylinder 5 and contacting the outer conical face 25 of the inner sleeve 22 thus closing the auxiliary exhaust valve. The outer and inner sleeves then move forward together and close the main exhaust valve 30 attached to the central stem 29 thus sealing the exhaust outlet. Further movement pushes the centre stem forward and displaces the inlet ball valve 14 from its seat, thus allowing fluid under pressure to enter the operating chamber 4 and pass through the outlet branch 7 to the brake mechanism. The pressure of the fluid in said chamber increases until the force acting on the helical spring 39 through the exhaust valve sleeves and the rocking lever is sufficient to further compress said spring and allow the exhaust valves to move back in closed relationship. This withdraws the finger 31 of the central stem in the inlet passage 10 and the fluid from the supply source forces the ball valve 14 back on to its seat, thus cutting off further supply of fluid to the operating chamber and brake mechanism. A constant pressure is thereby retained in said chamber corresponding to the actuating force on the helical spring.

If greater pressure is required on the brakes a greater force is applied to the foot pedal and the centre stem is again moved forward to reopen the inlet valve. Pressure will then build up to a higher value until said pressure is again sufficient to further compress the spring in the manner heretofore described.

To release the brakes the actuating force is removed from the foot pedal whereupon the movable rod 40 and helical spring 39 return to their inoperative positions. At this stage the central stem 29 within the inner exhaust valve sleeve 22 abuts against the stop pin 32, and the pressure fluid forces the inner and outer sleeves backwards thus opening the main exhaust valve. The inner sleeve then abuts against the stop pin and comes to rest whilst the outer sleeve is forced still further back thus opening the auxiliary exhaust valve. The fluid flows from the brake mechanism and operating chamber through the exhaust valves and is delivered to a reservoir through the exhaust branch 8. The provision of two exhaust valves ensures a rapid withdrawal of fluid from the brake mechanism thereby ensuring quick release of the brakes.

If desired the opening of the main exhaust valve can be so controlled that fluid flows from the operating chamber through said valve to the exhaust branch before the auxiliary valve opens. This is achieved by maintaining a slight pressure on the foot pedal, after the main valve has opened, thereby preventing the outer sleeve 17 from returning completely to its inoperative position and allowing the auxiliary valve 25 to remain closed on its seating 21. By this means pressure on the brakes can be released gradually.

Having described my invention what I claim is:

1. A device for controlling the supply of fluid under pressure to and from a fluid pressure operated mechanism which comprises a casing containing a supply chamber adapted to be connected to a source of fluid under pressure, an operating chamber adapted to be connected to a mechanism to be operated, an exhaust chamber adapted to be connected to exhaust, an inlet valve between the supply and operating chambers, co-axial main and auxiliary exhaust valves between the operating and exhaust chambers, the said auxiliary valve forming the seating of the said main valve, valve actuating means for admitting pressure fluid to and releasing it from the operating chamber, automatic means for maintaining a pressure in the operating chamber determined by the movement of the said valve actuating means, and means to permit the opening of the auxiliary exhaust valve after the main exhaust valve has opened a predetermined amount.

2. A control device according to claim 1 wherein the valve actuating means comprises a spring-controlled member, a rocking lever, and an element associated with the said exhaust valves the axis of the said spring-controlled member being substantially parallel to the axis of the said element whereby the movement of the spring-controlled member is communicated to the said valves.

3. Fluid pressure control mechanism which comprises a casing having a supply chamber, an exhaust chamber and an operating chamber between said supply chamber and said exhaust chamber and having an inlet passage between said supply chamber and said operating chamber and an exhaust passage between said operating chamber and said exhaust chamber, an inlet valve to close said inlet passage, a main exhaust valve and an auxiliary exhaust valve comprising a seat for said main exhaust valve in said exhaust passage, and a spring pressed sleeve slidable in said exhaust passage and forming a seat for said auxiliary exhaust valve and movable to close said auxiliary and main exhaust valves in succession and a stem actuated by said sleeve to open said inlet valve after closing said exhaust valves.

4. The mechanism of claim 3 having an element movable to vary the spring pressure on said sleeve.

5. A device for controlling the supply of fluid under pressure which comprises a supply chamber adapted to be connected to a source of fluid pressure, an operating chamber adapted to be connected to a mechanism to be operated, an exhaust chamber adapted to be connected to exhaust, an inlet valve between the supply and operating chambers, co-axial main and auxiliary exhaust valves between the operating and exhaust chambers and, an exhaust valve seat movable to engage and enclose said auxiliary exhaust valve and to close said auxiliary exhaust valve against said main exhaust valve and upon further movement to open said inlet valve, and a fixed stop positioned to engage successively said main exhaust valve and said auxiliary exhaust valve upon reverse movement to open said main and exhaust valves in succession.

6. The mechanism of claim 3 having a stop positioned to engage said main exhaust valve and said auxiliary exhaust valve in succession on reverse movement of said sleeves to open said main and said exhaust valves in succession with the closing of said inlet valve.

HENRY WILLIAM TREVASKIS.

REFERENCES CITED

The following references are of record in the file of this patent:

UNITED STATES PATENTS

| Number | Name | Date |
|---|---|---|
| 2,353,191 | Samiran | July 11, 1944 |
| 2,355,692 | Allen | Aug. 15, 1944 |